(12) United States Patent
Hou et al.

(10) Patent No.: US 12,519,298 B1
(45) Date of Patent: Jan. 6, 2026

(54) POWER SUPPLY BOX WITH ROTATABLE FLIP-TOP COVER

(71) Applicant: Zhuhai Shengchang Electronics Co., Ltd., Zhuhai (CN)

(72) Inventors: Chao Hou, Zhuhai (CN); Jialong Hu, Zhuhai (CN); Dehua Zheng, Zhuhai (CN)

(73) Assignee: Zhuhai Shengchang Electronics Co., Ltd., Zhuhai (CN)

( * ) Notice: Subject to any disclaimer, the term of this patent is extended or adjusted under 35 U.S.C. 154(b) by 0 days.

(21) Appl. No.: 18/829,379

(22) Filed: Sep. 10, 2024

(30) Foreign Application Priority Data

Aug. 19, 2024 (CN) .......................... 202422017078.6

(51) Int. Cl.
*H02G 3/14* (2006.01)
(52) U.S. Cl.
CPC ..................................... *H02G 3/14* (2013.01)
(58) Field of Classification Search
CPC ............ H02G 3/14; H02G 3/08; H02G 3/081

USPC ........................................................ 220/3.8
See application file for complete search history.

(56) References Cited

FOREIGN PATENT DOCUMENTS

CN         113410808 A      9/2021

*Primary Examiner* — Andrew D Perreault
(74) *Attorney, Agent, or Firm* — Rondaus PLLC; George Liu (57) ABSTRACT

The present disclosure provides a power supply box with a rotatable flip-top cover, includes a base body, a first cover body, a spacer and a second cover body, the base body is provided with an accommodating groove, and the accommodating groove is formed by connecting a bottom wall with a first side wall and a second side wall, one end of the first cover body is rotatably connected to the base body, so that the power supply box has an open state and a closed state, and in the closed state, the first cover body covers the accommodating groove; the spacer is convexly arranged on the bottom wall and abuts against the first side wall, so that the accommodating groove is isolated into a first groove area and a second groove area; the base body is provided with a wiring hole corresponding to the second groove area.

10 Claims, 5 Drawing Sheets

Fig. 9 ately connected to the base body, so that the power supply box has an open state and a closed state, and in the closed state, the first cover body covers the accommodating groove; and the power supply box further comprises:
POWER SUPPLY BOX WITH ROTATABLE FLIP-TOP COVER

TECHNICAL FIELD

The present disclosure relates to the technical field of power supply boxes, and in particular to a power supply box with a rotatable flip-top cover.

BACKGROUND

The base of the existing power supply box is typically detachably connected to the outer cover body and the inner cover body through a buckling method. On the one hand, this can lead to the cover body being easily lost during maintenance. On the other hand, the process of opening and closing the power supply box becomes relatively tedious, which is not conducive to improving use convenience. Furthermore, the inner cover body is generally used to cover the power supply cavity, which is often filled with silicone for heat dissipation and waterproofing purposes. When installing the inner cover plate using a buckling method, any misalignment during the process can cause the inner cover plate to adhere to the silicone, leading to contamination of the cover and making subsequent operations inconvenient.

SUMMARY

In order to overcome the shortcomings of the prior art, the objective of the present disclosure is to provide a power supply box which is beneficial to improving the use convenience and preventing the cover body from being lost during the disassembly and assembly process.

In order to solve the above problems, the technical solutions adopted by the present disclosure are as follows:

A power supply box with a rotatable flip-top cover, the power supply box comprises a base body and a first cover body, the base body is provided with an accommodating groove, and the accommodating groove is formed by connecting a bottom wall with a first side wall and a second side wall, where a number of the first side wall is two, the two first side walls are oppositely arranged, a number of the second side wall is two, and the two second side walls are oppositely arranged, where one end of the first cover body is rotatably connected to the base body, so that the power supply box has an open state and a closed state, and in the closed state, the first cover body covers the accommodating groove; and the power supply box further comprises:

a spacer, wherein the spacer is convexly arranged on the bottom wall and abuts against the first side wall, so that the accommodating groove is isolated into a first groove area and a second groove area, the first groove area is configured as a power supply cavity, the second groove area is configured as a wiring cavity, the base body is provided with a wiring hole corresponding to the second groove area, and the spacer is provided with a wire passing hole communicated with the first groove area and the second groove area; and a second cover body, wherein one end of the second cover body is rotatably connected to the base body, and in the closed state, the second cover body is located on one side of the first cover body opposite to the bottom wall to cover the first groove area, and a rotating end of the second cover body and a rotating end of the first cover body are arranged adjacent to the same second side wall.

Compared with the prior art, the beneficial effects of the present disclosure are:

In the present disclosure, the first cover body and the second cover body are both rotatably connected to the base body. Therefore, the power supply box can switch the closed state and the open state by rotating the first cover body, and the first cover body does not need to be repeatedly disassembled and assembled, so that the use convenience is improved, and meanwhile, the first cover body can be prevented from being lost. The first groove area can be exposed or covered by rotating the second cover body, and the second cover body does not need to be repeatedly disassembled and assembled, so that the use convenience is further improved, and the cover body is prevented from being lost. Therefore, the power supply box provided by the present disclosure is beneficial to improving the use convenience and preventing the cover body from being lost during the disassembly and assembly process.

The present disclosure will be further described in detail below in conjunction with the accompanying drawings and specific embodiments.

DETAILED DESCRIPTION OF THE EMBODIMENTS

The technical solutions in the embodiments of the present disclosure will be clearly and completely described below with reference to the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative efforts fall within the scope of protection of the present disclosure.

The terms "first", "second", and the like in the specification, claims, and above-mentioned accompanying drawings of the present disclosure are used to distinguish different objects rather than describe a specific order. Furthermore, the terms "including" and "having" and any variations thereof are intended to cover non-exclusive inclusion. It should be noted that when an element is referred to as being "fixed to" another element, it can be directly on the other element or intervening elements may also be present. When an element is referred to as being "connected to" another element, it may be directly connected to another element or intervening elements may also be present. When an element is referred to as being "arranged on" another element, it may be arranged on another element or intervening elements may also be present.

Embodiment 1

Figure 1:
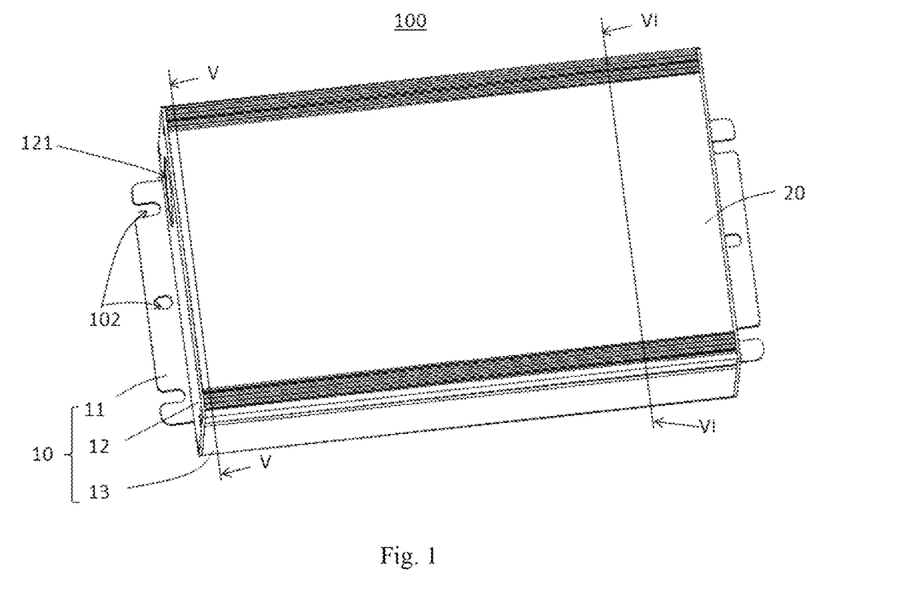
FIG. 1 is a schematic structural diagram of a power supply box according to an embodiment of the present disclosure.
Figure 2:
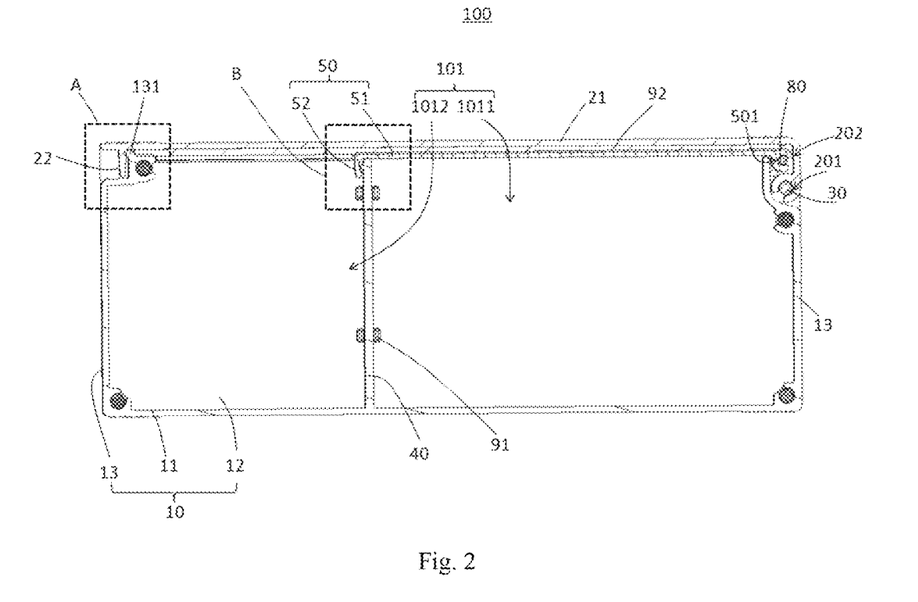
FIG. 2 is a cross-sectional view taken along line V-V of FIG. 1.
Figure 3:
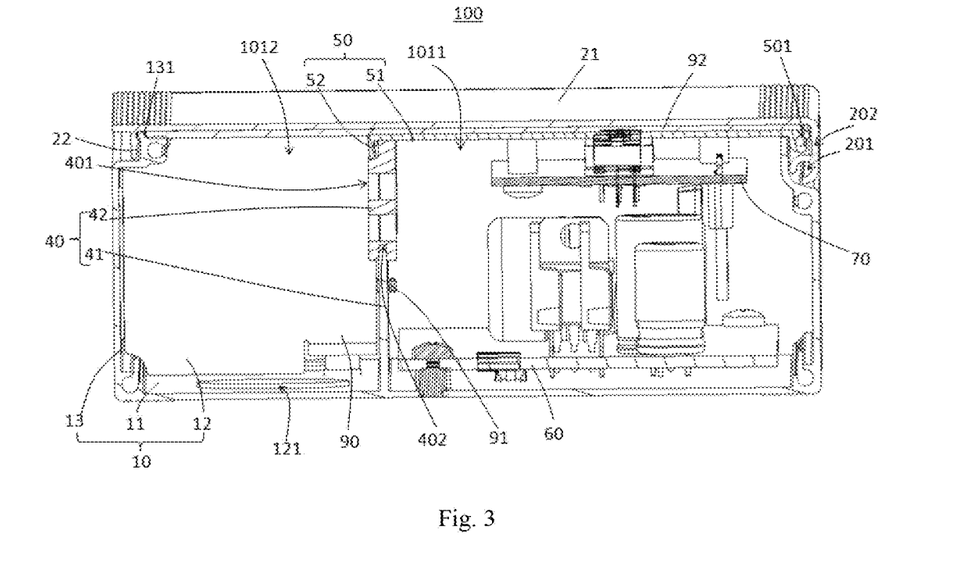
FIG. 3 is a cross-sectional view taken along line VI-VI of FIG. 1.
Figure 4:
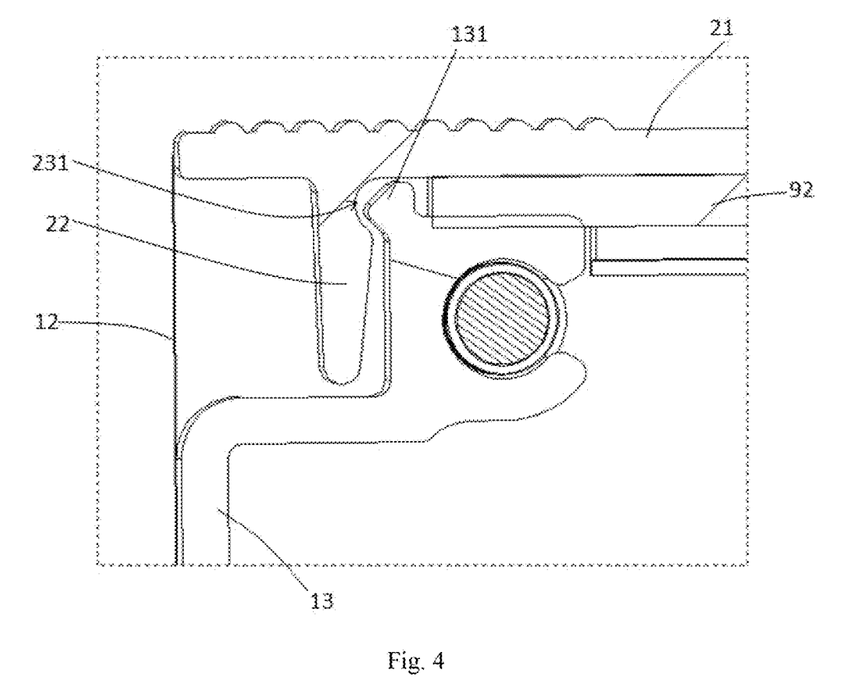
FIG. 4 is an enlarged view of part A shown in FIG. 2.
Figure 5:
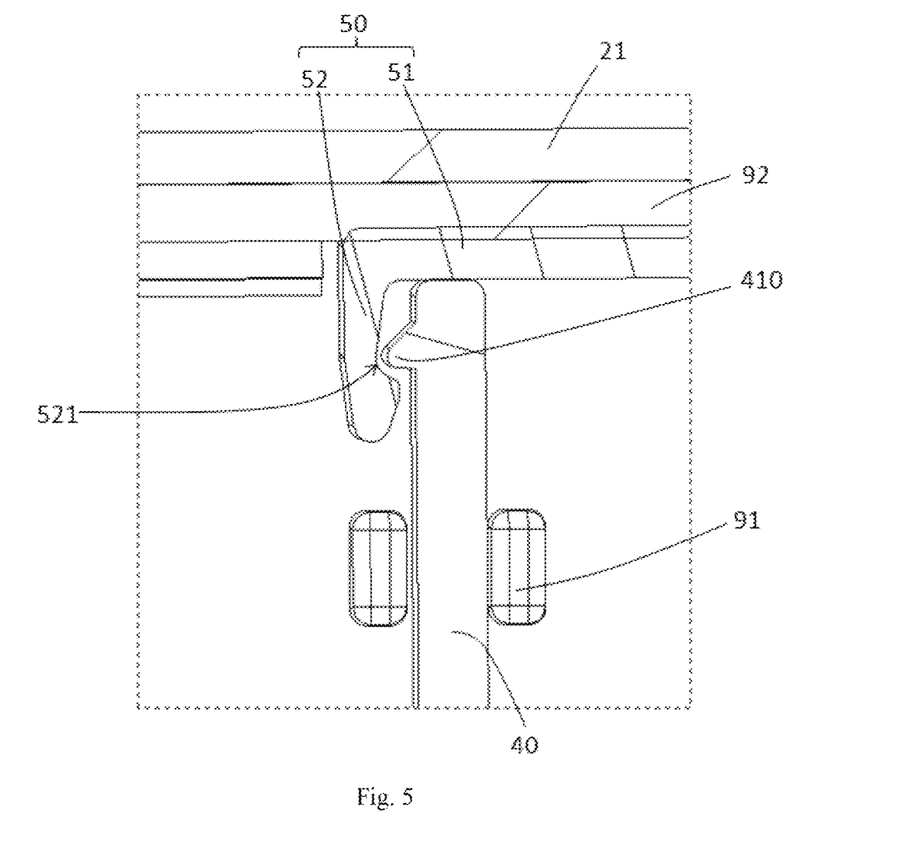
FIG. 5 is an enlarged view of part B shown in FIG. 2.

Referring to FIG. 1 to FIG. 3, an embodiment of the present disclosure provides a power supply box with a rotatable flip-top cover, hereinafter referred to as the power supply box 100. The power supply box 100 comprises a base body 10, a first cover body 20, a first spacer 40, and a second cover body 50.

The base body 10 is provided with an accommodating groove 101, and the accommodating groove 101 is formed by connecting a bottom wall 11 with a first side wall 12 and a second side wall 13, where a number of the first side wall 12 is two, the two first side walls 12 are oppositely arranged, a number of the second side wall 13 is two, and the two second side walls 13 are oppositely arranged. For example, the bottom wall 11, the first side wall 12 and the second side wall 13 can be connected by means of integral forming or screw fixing. One end of the first cover body 20 is rotatably connected to the base body 10, so that the power supply box 100 has an open state and a closed state. Specifically, when the first cover body 20 rotates in a direction away from the bottom wall 11, the power supply box 100 is in the open state, so that the accommodating groove 101 can be exposed, and when the first cover body 20 rotates in an opposite direction, the power supply box 100 is in the closed state. In the closed state, the first cover body 20 covers the accommodating groove 101.

A first spacer 40 is convexly arranged on the bottom wall 11 and abuts against the first side wall 12, so that the accommodating groove 101 is isolated into a first groove area 1011 and a second groove area 1012. The first groove area 1011 is configured as a power supply cavity. For example, the first groove area 1011 is configured to install a circuit board structure. The second groove area 1012 is configured as a wiring cavity. For example, the second groove area 1012 may be configured to accommodate wiring. For example, the first spacer 40 may be connected to at least one of the bottom wall 11 and the first side wall 12, the first spacer 40 is provided with a wire passing hole 401 communicated with the first groove area 1011 and the second groove area 1012, and the base body 10 is provided with a wiring hole 121 corresponding to the second groove area 1012, for example, the wiring hole 121 may be arranged on at least one of the bottom wall 11, the first side wall 12, and the second side wall 13. For example, the wiring hole 121 may be a knock-out hole or an opening. One end of the second cover body 50 is rotatably connected to the base body 10, and in the closed state, the second cover body 50 is located on one side of the first cover body 20 opposite to the bottom wall 11 to cover the first groove area 1011, and a rotating end of the second cover body 50 and a rotating end of the first cover body 20 are arranged adjacent to the same second side wall 13.

In the present disclosure, the first cover body 20 and the second cover body 50 are both rotatably connected to the base body 10. Therefore, the power supply box 100 can switch the closed state and the open state by rotating the first cover body 20, and the first cover body 20 does not need to be repeatedly disassembled and assembled, so that the use convenience is improved, and meanwhile, the first cover body 20 can be prevented from being lost. The first groove area can be exposed or covered by rotating the second cover body 50, and the second cover body 50 does not need to be repeatedly disassembled and assembled, so that the use convenience is further improved, and the cover body is prevented from being lost. Therefore, the power supply box 100 provided by the present disclosure is beneficial to improving the use convenience and preventing the cover body from being lost during the disassembly and assembly process.

In some embodiments, the power supply box 100 further comprises a first rotating shaft 30, a number of the first rotating shaft 30 is two, and the two first rotating shafts 30 are oppositely arranged, each first rotating shaft 30 is convexly arranged on one first side wall 12, opposite another first side wall 12, for example, the first rotating shaft 30 can be fixed in a through hole mounting, integrated forming, welding or bonding mode. The rotating end of the first cover body 20 is provided with a first clamping groove 201, the first clamping groove 201 is provided with a first side opening 2011 (referring to FIG. 7), where a number of the first side opening 2011 is two, and the two first side openings 2011 face away from each other, each first rotating shaft 30 extends into the first clamping groove 201 from the first side opening 2011, and the first rotating shaft 30 is arranged to be moved in and out from a notch of the first clamping groove 201 in a position-limited manner.

The first rotating shaft 30 can be clamped into or moved out of the clamping groove from a notch of the first clamping groove 201, so that the first cover body 20 is quickly disassembled and assembled. In addition, due to the fact that the notch has a limiting effect on the first rotating shaft 30, so that the first cover body 20 cannot be separated from the first rotating shaft 30 during the rotating process. In addition, the first cover body 20 is rotatably connected to the base body 10 in a clamping groove and rotating shaft mode, and the disassembly and assembly convenience of the first cover body 20 is conveniently improved.

Figure 6:
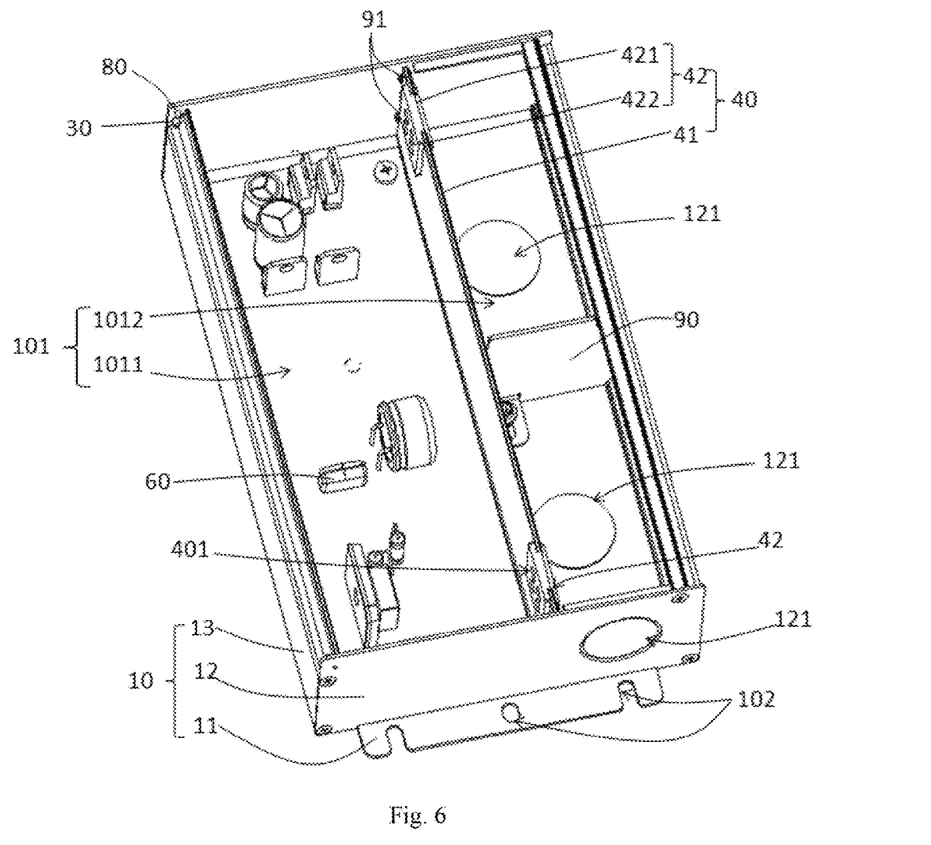
FIG. 6 is a partial structural diagram of a power supply box shown in FIG. 1.
Figure 7:
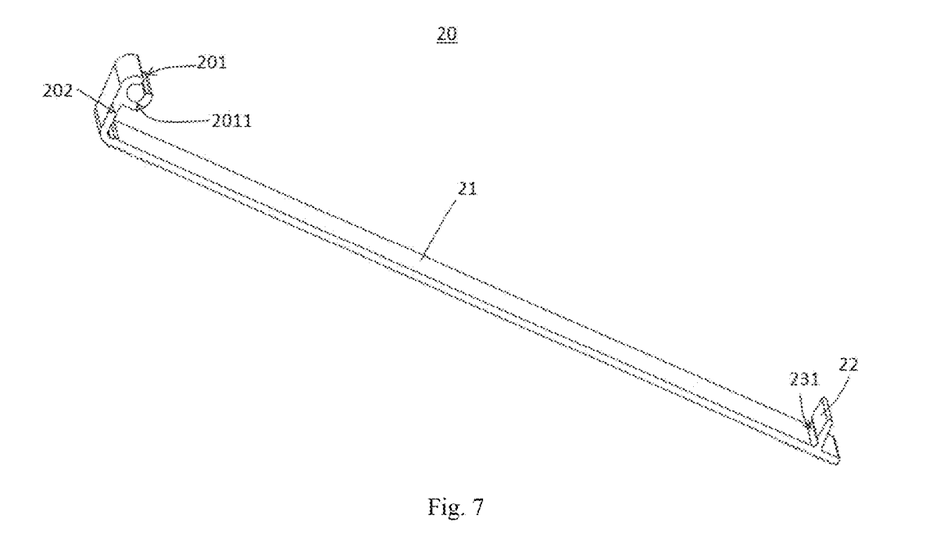
FIG. 7 is a schematic structural diagram of a first cover body shown in FIG. 1.
Figure 8:
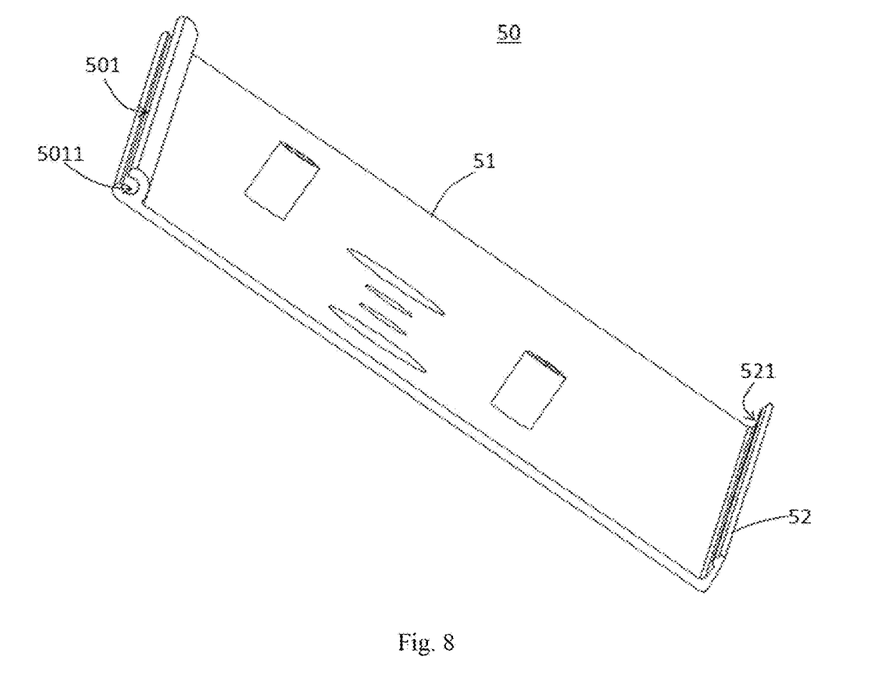
FIG. 8 is a schematic structural diagram of a second cover body shown in FIG. 2.

In some embodiments, referring to FIG. 2, FIG. 6 and FIG. 7, the power supply box 100 further comprises a second rotating shaft 80, a number of the second rotating shaft 80 is two, and the two second rotating shafts 80 are oppositely arranged. Each second rotating shaft 80 is convexly arranged on one first side wall 12, opposite another first side wall 12, and the second rotating shaft 80 is arranged on one side of the first rotating shaft 30 away from the bottom wall 11. The rotating end of the first cover body 20 is bent to form a first groove 202, the rotating end of the second cover body 50 is provided with a second clamping groove 501. Referring to FIG. 8, the second clamping groove 501 is provided with a second side opening 5011, where a number of the second side opening 5011 is two, and the two second side openings 5011 face away from each other, each second rotating shaft 80 extends into the second clamping groove 501 from the second side opening 5011, and the second rotating shaft 80 is arranged to be moved in and out from a notch of the second clamping groove 501 in a position-limited manner. The second cover body 50 can be rotatably connected in a rotating shaft and clamping groove mode, so that the disassembly and assembly convenience is improved. In addition, a position of the first rotating shaft 30 is matched with a structure of the first cover body 20, so that it is guaranteed that the first cover body 20 has a large rotatable angle, and meanwhile, the sealing performance of the power supply box 100 is improved.

In other embodiments, both the second cover body 50 and the first cover body 20 can be rotationally connected through a hinge structure.

In some embodiments, referring to FIG. 2, FIG. 4, FIG. 6 and FIG. 7, the first cover body 20 includes a first cover portion 21 and a second cover portion 22, the first cover portion 21 is configured to cover the accommodating groove 101, and one end of the first cover portion 21 is rotatably connected to the base body 10. The second cover portion 22 is connected to another end of the first cover portion 21 to form an included angle structure, and the second cover portion 22 is provided with a third clamping groove 231.

A first boss 131 is arranged at a top end of the second side wall 13 away from the rotating end of the first cover body 20, and in the closed state, the first boss 131 is fixed in the third clamping groove 231, and the first boss 131 is arranged to be detached from the third clamping groove 231. That is, the first boss 131 and the third clamping groove 231 are detachably clamped. The third clamping groove 231 is matched with the first boss 131, so that the connection stability of the first cover body 20 and the base body 10 is improved.

In some embodiments, referring to FIG. 2, FIG. 3, FIG. 5, and FIG. 8, the second cover body 50 includes a third cover portion 51 and a fourth cover portion 52, the third cover portion 51 is rotatably connected to the base body 10, and in the closed state, the third cover portion 51 covers the first groove area 1011. The fourth cover portion 52 is convexly arranged at one end of the third cover portion 51 to form an included angle structure, and in the closed state, the fourth cover portion 52 is arranged in the second groove area 1012, the fourth cover portion 52 is recessed relative to an end face of the first spacer 40 to form a fourth clamping groove 521, a second boss 410 located in the second groove area 1012 is convexly arranged at a top end of the first spacer 40, in the closed state, the second boss 410 is fixed in the fourth clamping groove 521, and the second boss 410 is arranged to be detached from the fourth clamping groove 521. Similarly, the fourth clamping groove 521 is matched with the second boss 410, so that the connection stability of the second cover body 50 is improved.

In some embodiments, referring to FIG. 2, FIG. 3, and FIG. 6, the power supply box 100 further comprises a circuit board 60 and an adjusting device 70. The circuit board 60 is arranged in the first groove area 1011, for example, the circuit board 60 can be fixed by screws. The adjusting device 70 is installed on the second cover body 50 and is electrically connected to the circuit board 60, for example, the adjusting device 70 may be configured to adjust at least one of the current and the voltage. In the closed state, the adjusting device 70 is arranged in the first groove area 1011, and an adjusting key of the adjusting device 70 is exposed on one side of the second cover body 50 away from the first groove area 1011, for example, the adjusting key may pass through the second cover body 50 to achieve an exposure effect. Specifically, the wiring can be sequentially connected to the second groove area 1012 and the wire passing hole 401 through the wiring hole 121 so as to be connected to the circuit board 60. The cooperation of the aforementioned components facilitates the maintenance, disassembly, and assembly of the circuit board 60 and the adjusting device 70.

In some embodiments, referring to FIG. 3 and FIG. 6, the first spacer 40 includes a body 41 and a wire protection sleeve 42, the body 41 is convexly arranged on the bottom wall 11 and abuts against the first side wall 12, an end face of the body 41 away from the bottom wall 11 is recessed to form a fifth clamping groove 402, and the fifth clamping groove 402 is communicated with the first groove area 1011 and the second groove area 1012. The wire protection sleeve 42 includes a first sleeve body 421 and a second sleeve body 422, and a number of the second sleeve body 422 is two; the first sleeve body 421 is connected between the two second sleeve bodies 422, the first sleeve body 421 is fixed in the fifth clamping groove 402, the first sleeve body 421 is provided with the wire passing hole 401, and the second sleeve body 422 abuts against an edge of the fifth clamping groove 402. It can be understood that the adjacent three ends of the second sleeve body 422 protrude out of the corresponding three ends of the first sleeve body 421, and the wire protection sleeve 42 is detachably clamped on the body 41, so that the wire protection sleeve 42 can be conveniently replaced as required to facilitate improvement of use adaptability. For example, the wire passing holes 401 of different sizes can be changed and replaced according to the wiring size.

In some embodiments, referring to FIG. 2, FIG. 3, and FIG. 6, the power supply box 100 further comprises a positioning assembly, and a number of the positioning assembly is two, each positioning assembly is convexly arranged on one first side wall 12 towards another first side wall 12, the positioning assembly includes a positioning piece 91, and a number of the positioning piece 91 is at least two; and observe along an arrangement direction of the two second side walls 13, two adjacent positioning pieces 91 of the positioning assembly and the adjacent first side walls 12 jointly form a limiting groove. The first spacer 40 is fixed in the limiting groove to realize installation. In the embodiment, the body 41 is fixed in the limiting groove. In the embodiment, the positioning assembly includes four positioning pieces 91; and observe along the arrangement direction of the two second side walls 13, the four positioning pieces 91 and the adjacent first side walls 12 jointly form two limiting grooves, and one limiting groove is formed between another limiting groove and the bottom wall 11 at intervals. The first spacer 40 is fixed via the positioning assembly to facilitate disassembly and assembly.

In other embodiments, the first spacer 40 can be fixed by means of screw fixing, integral forming, bonding, or welding.

In some embodiments, referring to FIG. 3 and FIG. 6, the power supply box 100 further comprises a second spacer 90, the second spacer 90 is convexly arranged on the bottom wall 11 and abuts between the first spacer 40 and the adjacent second side wall 13, so that the second groove area 1012 is isolated into at least two sections. For example, the second spacer 90 can be installed by means of screw fixation, bonding, welding, or integral forming, the number of the wire passing holes 401 is at least two, and each section is communicated with the first groove area 1011 through the wire passing hole 401. In the embodiment, the number of the wire protection sleeves 42 is the same as the number of the sections.

In some embodiments, referring to FIG. 1 and FIG. 6, two opposite ends of the bottom wall 11 protrude from the adjacent first side wall 12, with each end facing away from another first side wall 12, and a protruding part of the bottom wall 11 is provided with a mounting through hole 102 for mounting the power supply box 100.

In some embodiments, referring to FIG. 2 and FIG. 3, the power supply box 100 further comprises a waterproof pad 92, the waterproof pad 92 is arranged on an inner surface of the first cover body 20. Specifically, the waterproof pad 92 can be arranged on an inner surface of the first cover portion 21. For example, the material of the waterproof pad 92 can be one of silica gel, polyvinyl chloride, acrylic waterproof material, chinlon, polyester, polypropylene fiber or acrylic fiber.

Embodiment 2

The difference between the power supply box provided in the embodiment and the power supply box 100 provided in Embodiment 1 is that the rotation connection modes of the first cover body 20 and the second cover body 50 are different. Specifically, with reference to FIG. 2 and FIG. 9, a first rotating groove 132 and a second rotating groove 133 are formed in the second side wall 13 adjacent to the rotating end of a cover body. An opening of the first rotating groove 132 is arranged away from another second side wall 13, an opening of the second rotating groove 133 is arranged away from the bottom wall 11, and the second rotating groove 133 is located on one side of the first rotating groove 132 away from the bottom wall 11. The rotating end of the first cover body 20 is bent to form a first groove 202, a bottom wall of the first groove 202 is arranged relative to the second side wall 13, and a side wall of the first groove 202 away from the second rotating groove 133 is arranged to rotate in the first rotating groove 132. The rotating end of the second cover body 50 is bent to form a second groove 502, and a side wall of the second groove 502 close to the first rotating groove 132 is arranged to rotate in the second rotating groove 133.

Figure 9:
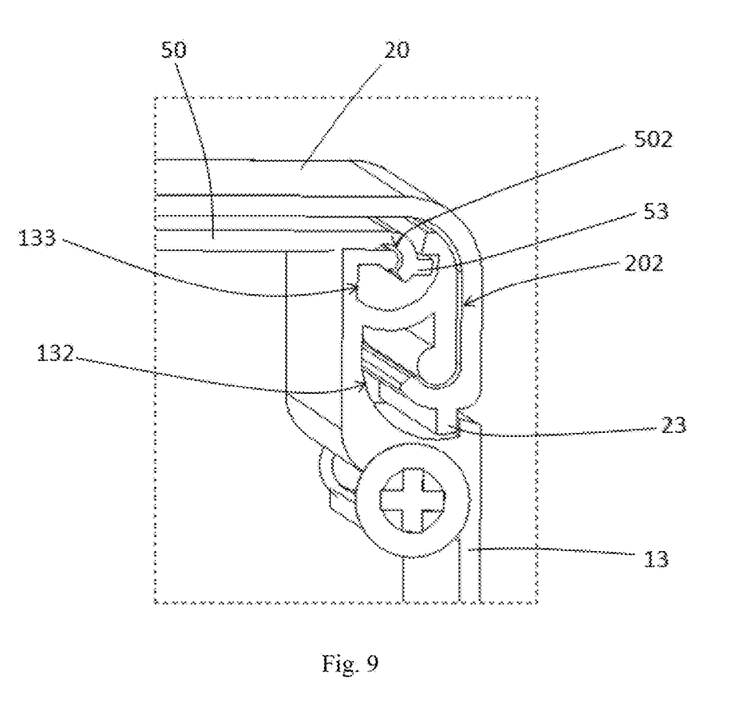
FIG. 9 is a partial view of a rotation connection mode of a first cover body, a second cover body and a second side wall corresponding to a power supply box according to another embodiment of the present disclosure.

The power supply box further comprises a third boss 23 and a fourth boss 53, and the third boss 23 is convexly arranged away from the second rotating groove 133 and is located on a side wall of the first groove 202 in the first rotating groove 132. The third boss 23 is configured to limit the first cover body 20 to be separated from the first rotating groove 132. The fourth boss 53 is convexly arranged away from the accommodating groove 101 and is located on a side wall of the second groove 502 in the second rotating groove 133. The fourth boss 53 is configured to limit the second cover body 50 to be separated from the second rotating groove 133. For example, the third boss 23 and the fourth boss 53 can be rotated out from the corresponding rotating groove through large external force. By adopting the rotation mode of the embodiment, the structure of the power supply box can be simplified.

The above-mentioned embodiments are only preferred embodiments of the present disclosure and cannot be used to limit the scope of protection of the present disclosure. Any non-substantive changes and substitutions made by those skilled in the art on the basis of the present disclosure shall belong to the scope of protection claimed by the present disclosure.

What is claimed is:

1. A power supply box with a rotatable flip-top cover, the power supply box comprises a base body and a first cover body, the base body is provided with an accommodating groove, and the accommodating groove is formed by connecting a bottom wall with a first side wall and a second side wall, where a number of the first side wall is two, the two first side walls are oppositely arranged, a number of the second side wall is two, and the two second side walls are oppositely arranged, wherein one end of the first cover body is rotatably connected to the base body, so that the power supply box has an open state and a closed state, and in the closed state, the first cover body covers the accommodating groove; and the power supply box further comprises:

a spacer, wherein the spacer is convexly arranged on the bottom wall and abuts against the first side wall, so that the accommodating groove is isolated into a first groove area and a second groove area, the first groove area is configured as a power supply cavity, the second groove area is configured as a wiring cavity, the base body is provided with a wiring hole corresponding to the second groove area, and the spacer is provided with a wire passing hole communicated with the first groove area and the second groove area; and a second cover body, wherein one end of the second cover body is rotatably connected to the base body, and in the closed state, the second cover body is located on one side of the first cover body opposite to the bottom wall to cover the first groove area, and a rotating end of the second cover body and a rotating end of the first cover body are arranged adjacent to the same second side wall.

2. The power supply box with the rotatable flip-top cover according to claim 1, further comprising:

a first rotating shaft, a number of the first rotating shaft is two, and the two first rotating shafts are oppositely arranged, wherein each first rotating shaft is convexly arranged on one first side wall, opposite another first side wall; and the rotating end of the first cover body is provided with a first clamping groove, the first clamping groove is provided with a first side opening, where a number of the first side opening is two, and the two first side openings face away from each other, each first rotating shaft extends into the first clamping groove from the first side opening, and the first rotating shaft is arranged to be moved in and out from a notch of the first clamping groove in a position-limited manner.

3. The power supply box with the rotatable flip-top cover according to claim 2, further comprising:

a second rotating shaft, a number of the second rotating shaft is two, and the two second rotating shafts are oppositely arranged, wherein each second rotating shaft is convexly arranged on one first side wall, opposite another first side wall, and the second rotating shaft is arranged on one side of the first rotating shaft away from the bottom wall; and the rotating end of the first cover body is bent to form a first groove, a side wall of the first groove away from the second rotating shaft is provided with the first clamping groove, the rotating end of the second cover body is provided with a second clamping groove, the second clamping groove is provided with a second side opening, where a number of the second side opening is two, and the two second side openings face away from each other, each second rotating shaft extends into the second clamping groove from the second side opening, and the second rotating shaft is arranged to be moved in and out from a notch of the second clamping groove in a position-limited manner.

4. The power supply box with the rotatable flip-top cover according to claim 1, wherein the first cover body includes:

a first cover portion, wherein the first cover portion is configured to cover the accommodating groove, and one end of the first cover portion is rotatably connected to the base body; and a second cover portion, wherein the second cover portion is connected to another end of the first cover portion to form an included angle structure, the second cover portion is provided with a third clamping groove, a first boss is arranged at a top end of the second side wall away from the rotating end of the first cover body, and in the closed state, the first boss is fixed in the third clamping groove, and the first boss is arranged to be detached from the third clamping groove.

5. The power supply box with the rotatable flip-top cover according to claim 4, wherein the second cover body includes:
- a third cover portion, wherein the third cover portion is rotatably connected to the base body, and in the closed state, the third cover portion covers the first groove area; and
- a fourth cover portion, wherein the fourth cover portion is convexly arranged at one end of the third cover portion, and in the closed state, the fourth cover portion is arranged in the second groove area, the fourth cover portion is recessed relative to an end face of the first spacer to form a fourth clamping groove, a second boss located in the second groove area is convexly arranged at a top end of the first spacer, in the closed state, the second boss is fixed in the fourth clamping groove, and the second boss is arranged to be detached from the fourth clamping groove.

6. The power supply box with the rotatable flip-top cover according to claim 1, wherein a first rotating groove and a second rotating groove are formed in the second side wall adjacent to the rotating end of a cover body, an opening of the first rotating groove is arranged away from another second side wall, an opening of the second rotating groove is arranged away from the bottom wall, and the second rotating groove is located on one side of the first rotating groove away from the bottom wall;
- the rotating end of the first cover body is bent to form a first groove, a bottom wall of the first groove is arranged relative to the second side wall, a side wall of the first groove away from the second rotating groove is arranged to rotate in the first rotating groove, the rotating end of the second cover body is bent to form a second groove, and a side wall of the second groove close to the first rotating groove is arranged to rotate in the second rotating groove;
- the power supply box further comprises:
- a third boss, wherein the third boss is convexly arranged away from the second rotating groove and is located on a side wall of the first groove in the first rotating groove, and the third boss is configured to limit the first cover body to be separated from the first rotating groove; and
- a fourth boss, wherein the fourth boss is convexly arranged away from the accommodating groove and is located on a side wall of the second groove in the second rotating groove, and the fourth boss is configured to limit the second cover body to be separated from the second rotating groove.

7. The power supply box with the rotatable flip-top cover according to claim 1, wherein the spacer includes:
- a body, wherein the body is convexly arranged on the bottom wall and abuts against the first side wall, an end face of the body away from the bottom wall is recessed to form a fifth clamping groove, and the fifth clamping groove is communicated with the first groove area and the second groove area; and
- a wire protection sleeve, wherein the wire protection sleeve includes a first sleeve body and a second sleeve body, and a number of the second sleeve body is two; the first sleeve body is connected between the two second sleeve bodies, the first sleeve body is fixed in the fifth clamping groove, the first sleeve body is provided with the wire passing hole, and the second sleeve body abuts against an edge of the fifth clamping groove.

8. The power supply box with the rotatable flip-top cover according to claim 1, further comprising:
- a positioning assembly, and a number of the positioning assembly is two, wherein each positioning assembly is convexly arranged on one first side wall towards another first side wall, the positioning assembly includes a positioning piece, and a number of the positioning piece is at least two; and observe along an arrangement direction of the two second side walls, two adjacent positioning pieces of the positioning assembly and the adjacent first side walls jointly form a limiting groove, and the first spacer is fixed in the limiting groove.

9. The power supply box with the rotatable flip-top cover according to claim 1, further comprising:
- a waterproof pad, wherein the waterproof pad is arranged on an inner surface of the first cover body, and in the closed state, the waterproof pad covers the accommodating groove.

10. The power supply box with the rotatable flip-top cover according to claim 1, further comprising:
- a circuit board, wherein the circuit board is arranged in the first groove area; and
- an adjusting device, wherein the adjusting device is installed on the second cover body and is electrically connected to the circuit board, and in the closed state, the adjusting device is arranged in the first groove area, and an adjusting key of the adjusting device is exposed on one side of the second cover body away from the first groove area.

* * * * *